United States Patent Office.

ROBERT O. LOWREY, OF SALEM, NEW YORK.

Letters Patent No. 77,991, dated May 19, 1868; antedated May 12, 1868.

IMPROVED PLASTIC COMPOUND FOR ROOFING AND OTHER PURPOSES.

*The Schedule referred to in these Letters Patent and making part of the same.*

TO ALL WHOM IT MAY CONCERN:

Be it known that I, ROBERT O. LOWREY, of Salem, in the county of Washington, and State of New York, have invented certain new and useful Improvements in Fibreus Compounds; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in the union of vegetable fibre, either alone or with other material, with silicate of soda, and then treating the compound with a solution of chloride of calcium, for the production of a new compound, suitable for roofing, and the manufacture of various articles.

For the production of my compound, I take vegetable fibre, ground or otherwise prepared as for the manufacture of paper, and mix it with the silicate of soda. In this condition, it forms a pasty mass, and may be moulded into blocks, or spread upon roofs or other surfaces like plaster, or rolled or pressed into sheets of any desired size and thickness; or the pasty mass may be moulded or formed into pipes, buckets, tubes, or any other desired article, either for use or ornament. When thus formed, I treat the compound with a solution of chloride of calcium, which converts the soluble silicate of soda into an insoluble silicate, and thus cements the particles together in a firm mass. After the compound has been saturated or first treated with the chloride of calcium, and has become sufficiently hard to be handled with safety, the block or article is then immersed in the solution of chloride of calcium, and boiled or kept hot therein for several hours, the length of time being dependent upon the size and other circumstances, after which it is washed with water. When the composition is used in the form of a mortar, for roofing and similar purposes, this cannot be done, and, in such cases, I prefer to apply the solution hot in the first instance, and then wash it with water.

For some purposes, when it is desired to produce coarser and heavier articles, I mix with the fibre a portion of sand, clay, or similar material, instead of using the fibre alone with the silicate of soda, the after-treatment being the same as already described.

The compound thus formed is very strong and tough, and not liable to crack or check, and is not affected by heat or cold, and is thoroughly fire-proof. Being somewhat pliable, more especially when the fibre is used without the addition of sand or similar substances, articles made from it are very strong and tough, and not easily broken or injured.

In case there should be an excess of the solution of chloride of calcium remaining in the block or article, it may be treated with any solution that will decompose it or render it insoluble.

Having thus described my invention, what I claim is—

The compound produced by the admixture of silicate of soda with vegetable fibre, with or without the addition of sand, clay, and similar substances, and then treating the same with a solution of the chloride of calcium, substantially as described.

R. O. LOWREY.

Witnesses:
   W. C. DODGE,
   P. T. DODGE.